Patented Feb. 24, 1953

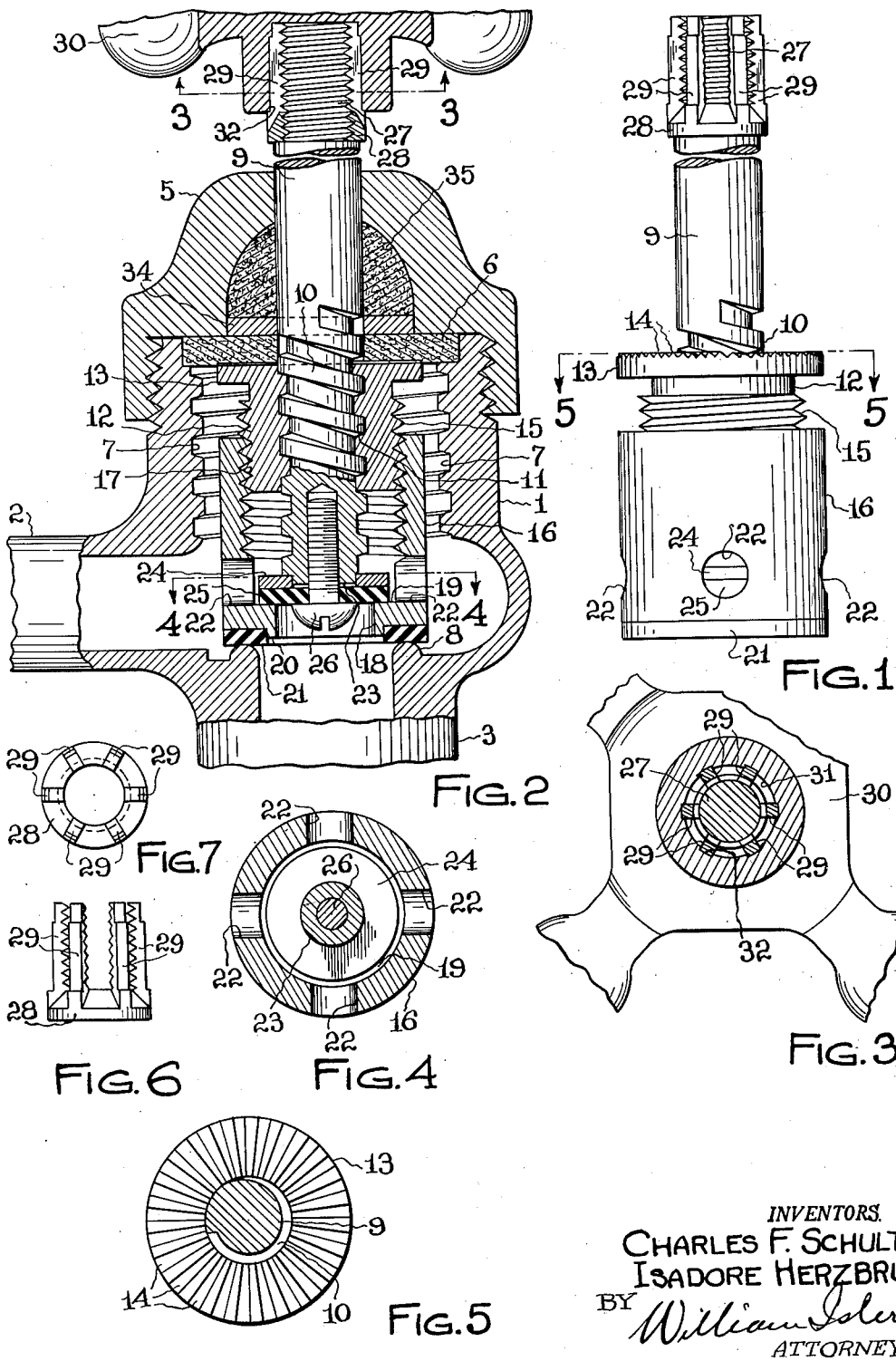

2,629,580

UNITED STATES PATENT OFFICE 2,629,580

REPLACEMENT STEM FOR FAUCETS AND THE LIKE

Charles F. Schultis, Cleveland, and Isadore Herzbrun, Cleveland Heights, Ohio

Application November 4, 1947, Serial No. 783,984

1 Claim. (Cl. 251—156)

1

This invention relates, as indicated, to a replacement stem for faucets and the like.

A primary object of the invention is to provide a stem of the character described, having a valve stem housing consisting of parts which are relatively adjustable, whereby the stem may be used within faucets having body chambers of various lengths or heights.

Another object of the invention is to provide a stem of the character described, having a cylindrical valve stem housing consisting of parts which are threadedly connected with each other.

A further object of the invention is to provide a stem of the character described, having a multipart valve-stem housing, provided with means for sealing a defective seat within a faucet or the like.

A further object of the invention is to provide a stem of the character described, having a multipart valve-stem housing, provided with a valve seat.

A further object of the invention is to provide a stem of the character described, having means associated therewith adapted for the attachment to the stem of handles of various types and sizes.

A still further object of the invention is to provide a replacement stem which has virtually universal application to all conventional types and sizes of faucets and valves.

Other objects and advantages of the invention will be apparent during the course of the following description.

In the accompanying drawings, forming a part of this specification, and in which like numerals are employed to designate like parts throughout the same, Fig. 1 is a side elevational view of a replacement stem, embodying the novel features of the invention;

Fig. 2 is a vertical fragmentary cross-sectional view through a conventional type of faucet, showing the replacement stem in position therein;

Fig. 3 is a fragmentary cross-sectional view, taken on the line 3—3 of Fig. 2;

Fig. 4 is a cross-sectional view, taken on the line 4—4 of Fig. 2;

Fig. 5 is a cross-sectional view, taken on the line 5—5 of Fig. 1;

Fig. 6 is a side elevational view of a special nut adapted for the attachment of a handle to the stem, and Fig. 7 is a top plan view of the nut shown in Fig. 6.

Referring more particularly to the drawings, there is illustrated a faucet of more or less conventional type, comprising a body portion 1 from which a spout or nozzle 2 extends, the faucet being further provided with a tubular extension 3 for connection to the fluid distribution system.

The faucet further includes a cap or bonnet 5

2 which is threadedly secured to the body portion 1 of the faucet, a fiber washer 6 being interposed between the body portion 1 and cap 5 to preclude leakage at the joint therebetween.

A faucet of this type is usually provided with internal threads 7 for the connection thereto of a rotatable valve stem (not shown), the upper portion of which extends through the cap or bonnet 5, and which is normally provided at its lower end with a removable rubber or fibre washer adapted, when the valve stem is rotated in one direction, to engage the annular valve seat 8 of the faucet, to thereby close off communication between the extension 3 and spout or nozzle 2.

The valve seat 8, as a result of continued use, eventually becomes pitted or worn to such an extent that mere replacement of the washer on the valve stem is not effective to preclude leakage through the defective or worn seat.

In order to prevent such leakage through the valve seat, the novel replacement or repair stem of the present invention may be used to advantage.

The replacement stem comprises a stem proper 9, provided adjacent its lower end with coarse pitch threads 10, which engage similar threads 11 on the interior of a tubular member 12.

The member 12 is provided at its upper end with a radially-outwardly extending flange 13, the upper surface of which is provided with knurlings or teeth 14, which extend across such surface in a direction which is substantially radial to the stem 9.

The member 12 is also provided on its external surface with threads 15 which are of relatively fine pitch as compared with the threads 10 of the stem 9.

The member 12 is in threaded engagement with a tubular sleeve 16, which, for this purpose, is provided internally thereof with threads 17. The sleeve 16 is provided at its lower end with a radially-inwardly extending flange 18, forming a seat or shoulder 19. The flange 18 is provided with a tubular extension 20 having an external diameter which is less than the diameter of the sleeve 16. A fibre washer 21 is press-fitted upon the extension 20 of the sleeve 16. The external surface of the washer 21 is substantially flush with the exterior of the sleeve 16, and the washer is of slightly greater depth than the length of the extension 20.

The sleeve 16 is further provided with a multiplicity of circumferentially-spaced radial openings or ports 22 in the wall thereof.

The stem 9 is provided with an extension 23 at its lower end of slightly reduced diameter, and about which a brass washer 24 is disposed, this washer being of slightly greater diameter than the stem. A removable and replaceable fibre washer 25, of substantially the same diameter as the washer 24, is secured to the lower end of the stem 9 by means of a screw 26.

The stem 9 is provided at its upper end with a threaded extension 27 of reduced diameter, to which a nut of case hardened cold-rolled steel is threadedly secured. The nut consists of an annular base portion 28, having a multiplicity of circumferentially-spaced splines 29 extending upwardly from the base. The lower portions of the splines 29 are of somewhat less thickness than the base, while the upper portions thereof are of somewhat less thickness than the lower portions thereof. The inner surfaces of the base 28 and splines 29 of the nut are provided with threads for engagement with the threads of the extension 27 of the stem.

The nut 28—29 serves for the attachment to the stem 9 of a handle 30. In attaching the handle 30 to the stem, the opening 31 in the handle is placed directly over the nut, this opening being of slightly less diameter than the external diameter of the splines 29. The handle is then struck with a hammer or otherwise pressed downwardly upon the nut, as a result of which the splines 29 form or cut grooves or keyways 32 in the wall of the opening 31, thereby locking the handle against rotation relatively to the nut, as well as against axial displacement from the nut. At the same time, the splines 29 are squeezed against the threads of the extension 27 with sufficient force to preclude turning of the nut relatively to such extension, so that the handle becomes, in a sense, rigidly attached to the stem. By the use of such a nut, virtually any and all types of handles can be quickly and easily secured to the replacement stem.

The faucet further includes a metallic washer 34 disposed directly above the washer 6, and a packing 35 of fibrous or other material which is disposed within the cap 5, about the stem 9, for precluding leakage through the joint between the cap and stem.

In replacing the conventional stem in the faucet, the cap 5 is first removed, and the stem is taken out, as by unthreading it from the threads 7.

The replacement stem of the present invention is then inserted within the body of the faucet, with the washer 21 bearing on the seat 8 of the faucet. The member 12 is then adjusted relatively to the sleeve 16, until the upper end of the member 12 is substantially flush with or slightly below the upper end of the body portion of the valve. The washer 6 is then placed directly over the member 12, and the cap 5 is then screwed to the body of the faucet. This causes the washer 6 to be compressed to an extent such that the teeth 14 bite into the lower surface of the washer 6, thereby locking the member 12 and sleeve 16 against subsequent rotation. This screwing down of the cap 5 also has the effect of compressing the washer 21 to such an extent that the washer fills and closes any cracks or other openings in the seat 8, thereby stopping all leaks through the joint between the washer 21 and seat 8. The shoulder 19 forms, in effect, a new valve seat. The replacement stem is now ready for use.

Upon rotation of the stem 9 in one direction, the washer 25 is lifted from the seat or shoulder 19, permitting fluid to flow upwardly from the extension 3, into the sleeve 16, and outwardly from the openings or ports 22 into the nozzle or spout 2.

It will be apparent that by virtue of the member 12, the stem may be adjusted to fit within faucets or valves of various lengths, so that the replacement stem is of virtually universal application or use. The replacement stem, in other words, is adjustable to all makes of plumbing faucets and valves, accommodating itself to various depths or lengths of such makes.

It is to be understood that the form of our invention, herewith shown and described, is to be taken as a preferred example of the same, and that various changes in the shape, size and arrangement of parts may be resorted to, without departing from the spirit of our invention, or the scope of the subjoined claim.

Having thus described our invention, we claim:

In combination, a faucet having a body portion, a cap, a seat within said body portion, a valve stem housing within said body portion, said housing comprising an upper member and a lower member, said lower member being provided with a flange having an opening therethrough and forming a shoulder and having a multiplicity of circumferentially spaced openings therein adjacent said shoulder, a packing on said lower member between said flange and said seat, said upper member having external threads engaging internal threads on the lower member so as to adjust said members relative to each other whereby the effective length of the housing may be varied to fit into faucet body portions of different heights, a packing sealing the upper end of the body interposed between said cap and said upper member and being pressed against the upper member upon rotation of said cap for forcing said housing against the seat, the upper end of the upper member being provided with a toothed surface which bites into the packing engaging said surface thereby locking the housing members against rotation, and a valve stem threadedly engaging internal threads in said upper member and carrying a valve seating on said shoulder whereby the valve housing together with the valve stem are removed as a unit from said body upon removal of said cap.

CHARLES F. SCHULTIS.
ISADORE HERZBRUN.

REFERENCES CITED

The following references are of record in the file of this patent:

UNITED STATES PATENTS

| Number | Name | Date |
|---|---|---|
| 928,751 | Harcourt | July 20, 1909 |
| 1,117,723 | Swyney | Nov. 17, 1914 |
| 1,301,278 | Labus | Apr. 22, 1919 |
| 1,494,543 | Hazeltine | May 20, 1924 |
| 1,677,794 | Mueller | July 17, 1928 |
| 1,884,207 | Pollock | Oct. 25, 1932 |
| 1,914,260 | Kennedy | June 13, 1933 |
| 1,953,358 | Mantz | Apr. 3, 1934 |
| 1,988,966 | Eckhouse | Jan. 22, 1935 |
| 1,989,083 | Dahnken | Jan. 29, 1935 |
| 2,188,850 | Zinkil | Jan. 30, 1940 |
| 2,549,010 | Rhodes | Apr. 17, 1951 |

FOREIGN PATENTS

| Number | Country | Date |
|---|---|---|
| 18,944 | Great Britain | of 1910 |